(12) United States Patent
Saitoh

(10) Patent No.: US 9,776,637 B2
(45) Date of Patent: Oct. 3, 2017

(54) TRANSMISSION

(71) Applicant: YAMAHA HATSUDOKI KABUSHIKI KAISHA, Iwata-shi, Shizuoka (JP)

(72) Inventor: Tetsushi Saitoh, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 53 days.

(21) Appl. No.: 14/972,331

(22) Filed: Dec. 17, 2015

(65) Prior Publication Data

US 2016/0176405 A1 Jun. 23, 2016

(30) Foreign Application Priority Data

Dec. 18, 2014 (JP) ................. 2014-255994

(51) Int. Cl.
*F16H 59/02* (2006.01)
*B60W 30/18* (2012.01)
*B60W 10/02* (2006.01)
*B60W 10/113* (2012.01)
*B60W 10/11* (2012.01)
*F16H 61/02* (2006.01)

(52) U.S. Cl.
CPC .......... *B60W 30/18* (2013.01); *B60W 10/02* (2013.01); *B60W 10/11* (2013.01); *B60W 10/113* (2013.01); *F16H 61/0204* (2013.01); *F16H 61/0213* (2013.01); *B60W 2510/0604* (2013.01); *B60W 2540/14* (2013.01); *B60W 2540/16* (2013.01); *B60W 2710/022* (2013.01); *B60W 2710/1005* (2013.01); *F16D 2500/1082* (2013.01); *F16D 2500/1083* (2013.01); *F16D 2500/1085* (2013.01); *F16D 2500/50203* (2013.01)

(58) Field of Classification Search
CPC ................................................ F16H 2059/0221
See application file for complete search history.

(56) References Cited

U.S. PATENT DOCUMENTS

| | | | |
|---|---|---|---|
| 6,348,023 B1 | 2/2002 | Martelli | |
| 8,909,446 B2* | 12/2014 | Kojima | F16H 61/0204 192/31 |
| 9,212,737 B2* | 12/2015 | Nakamura | F16D 21/02 |
| 2011/0125377 A1* | 5/2011 | Saitoh | F16D 48/06 701/67 |
| 2014/0095039 A1 | 4/2014 | Kojima et al. | |

FOREIGN PATENT DOCUMENTS

JP 4150481 B2 9/2008

* cited by examiner

*Primary Examiner* — Tisha Lewis
(74) *Attorney, Agent, or Firm* — Keating and Bennett, LLP

(57) ABSTRACT

A transmission changes gears in a MT system, an AT system, and an AMT system wherein unintended transition between an AT mode and a MT mode or between an AMT mode and a MT mode is prevented. A selector in a controller performs a mode selection control such that, when performing transition between the AT mode and the MT mode or between the AMT mode and the MT mode, the driver at least has to operate a mode switching switch while operating a clutch lever in an operation amount not smaller than a predetermined threshold.

12 Claims, 11 Drawing Sheets

| | | MT | AMT | AT |
|---|---|---|---|---|
| MODE IMAGE | | | | |
| CLUTCH OPERATION | AT START | ● | AUTOMATIC | AUTOMATIC |
| | AT TRANSMISSION | AUTOMATIC | AUTOMATIC | AUTOMATIC |
| | AT STOP | ● | AUTOMATIC | AUTOMATIC |
| | AT EMERGENCY | ● | ● | ● |
| SHIFT OPERATION | N→1 | ● | ● | ● |
| | AT TRANSMISSION | ● | ●/TIME | AUTOMATIC |
| | 1→N | ● | ● | ●/TIME |
| | 2→1 | ● | ● | ● |
| CONDITION OF START | CLUTCH | ● | | |
| | SHIFT | ● | ● | ● |
| | ACCELERATOR | ● | ● | ● |
| | NUMBER OF OPERATION | 3 | 2 | 2 |
| SAFETY | ERRONEOUS START PREVENTION PERFORMANCE | EXCELLENT | GOOD | GOOD |
| | FREEDOM OF ACCELERATION IN STARTING | GOOD | FAIR | FAIR |
| IDEAS/ REQUESTS | CLUTCH DECELERATION WHILE RUNNING | GOOD | GOOD | GOOD |

FIG. 11

TRANSMISSION

CROSS REFERENCE TO RELATED APPLICATIONS

This application is entitled to and claims the benefit of Japanese Patent Application No. 2014-255994, filed on Dec. 18, 2014, the disclosure of which including the specification, drawings, and abstract is incorporated herein by reference in its entirety.

BACKGROUND OF THE INVENTION

1. Field of the Invention

The present invention relates to a transmission mounted in a vehicle.

2. Description of the Related Art

Heretofore, various kinds of transmission systems have been used in a drive system of a vehicle, including manual transmission (hereinafter referred to as "MT") systems in which a driver changes a transmission gear by driving a shift actuator by using a clutch pedal (clutch lever) and a shift pedal (shift switch).

Automatic transmission ("AT") systems are transmission systems in which a shift actuator is automatically driven, and a transmission gear is changed according to the speed, engine rotation speed, or the like of a vehicle.

Among the AT systems, torque converter ATs that use a combination of a torque converter and a planetary gear and perform automatic gear change by hydraulic control are most popularly used in vehicles. In a torque converter AT, gear change timing is precisely set based on various factors such as adjustment of accelerator depression, vehicle speed, and so forth by computer control.

Automated manual transmission ("AMT") systems are transmission systems in which only clutch operation is automated and a shift pedal (shift switch) is operated in the same manner as that of MT systems. AMT systems are also called semi-automatic transmission systems.

In AT systems or AMT systems, clutch operation at the time of starting is automatically performed in a simplified manner as compared with MT systems. MT systems are also called "3-pedal mode" since the transmission is operated in MT systems by using three pedals including an accelerator pedal (accelerator grip), a brake pedal, and a clutch pedal (clutch lever). Meanwhile, AT systems and AMT systems are called "2-pedal mode" since AT systems and AMT systems do not require clutch pedal (clutch lever) operation, and the transmission is operated by using two pedals including an accelerator pedal (accelerator grip) and a brake pedal.

Today, AMT systems mounted in passenger cars also automatically perform gear selection by controlling accelerator opening and clutch and gearbox actuators through by-wire control (electronic control). Furthermore, a dual clutch automated manual transmission (DCT), which is an automatic transmission that includes a clutch including two power transmission paths, is also known as a transmission.

Japanese Patent Publication No. 4150481 discloses a motorcycle in which a transmission system can be selected from a semi-automatic transmission system and a fully automatic transmission system.

However, Japanese Patent Publication No. 4150481 does not disclose the timing and conditions of switching the transmission system.

SUMMARY OF THE INVENTION

In view of such circumstances, preferred embodiments of the present invention provide a transmission in which gear changes in a MT system, an AT system, and an AMT system are able to be performed, and unintended transition between the AT mode and the MT mode or between the AMT mode and the MT mode is prevented.

A transmission according to a preferred embodiment of the present invention includes clutch actuators that disengage a clutch of a multi-speed transmission; a shift actuator that performs gear shifting of the multi-speed transmission; a controller that controls the clutch actuators and the shift actuator; a clutch lever; a lever operation amount detector that converts an operation amount of the clutch lever to an electrical signal and outputs the electrical signal to the controller; and a shift switch that outputs a request of gear shifting by a driver to the controller, in which the controller performs control in an AMT mode, an AT mode, or a MT mode, the AMT mode being an operation mode in which a series of shift change operations are performed by controlling the clutch actuators and the shift actuator in a coordinated manner when a shift change command is input by an operation of the shift switch by the driver in a transmission operation during traveling, and the clutch actuator is controlled regardless of an operation of the clutch lever by the driver in a starting process and a stopping process; the AT mode being an operation mode in which shift selection and the series of shift change operations are performed by controlling the clutch actuators and the shift actuator regardless of the operation of the shift switch by the driver in the transmission operation during traveling, and the clutch actuator is controlled regardless of the operation of the clutch lever by the driver in the starting process and the stopping process; the MT mode being an operation mode in which the series of shift change operations are performed by controlling the clutch actuators and the shift actuator in a coordinated manner when the shift change command is input by the operation of the shift switch by the driver in the transmission operation during traveling, and the clutch actuators are controlled such that the clutch is operated with a clutch torque capacity corresponding to the operation of the clutch lever by the driver in at least one of the starting process and the stopping process; a mode switching switch that outputs a request to change the operation mode by the driver to the controller; and the controller performs a mode selection control such that, when performing a mode transition between the AT mode and the MT mode or between the AMT mode and the MT mode, the driver at least has to operate the mode switching switch while operating the clutch lever in an operation amount not smaller than a predetermined threshold.

According to preferred embodiments of the present invention, when performing transition between the AT mode and the MT mode or between the AMT mode and the MT mode, the driver at least has to operate a mode switching switch while operating the clutch lever in an operation amount not smaller than a predetermined threshold, and thus unintended transition between the AT mode and the MT mode or between the AMT mode and the MT mode is prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 shows operation modes of the transmission according to a preferred embodiment of the present invention.

DETAILED DESCRIPTION OF THE PREFERRED EMBODIMENTS

In the following, preferred embodiments of the present invention are described in detail with reference to the accompanying drawings.

A transmission according to a preferred embodiment of the present invention is mounted in a vehicle such as a motorcycle and an all-terrain vehicle (ATV). In the present preferred embodiment, a transmission is mounted in a motorcycle. In the present preferred embodiment, the front, rear, left, and right correspond to the front, rear, left, and right as viewed from the driver seated on the seat of the motorcycle.

The transmission according to a preferred embodiment is equipped with a plurality of friction drive clutches that implement seamless gear change by performing power transfer alternately between odd-numbered gears and even-numbered gears, and is mounted on a motorcycle as a drive unit together with a single engine. First, an outline description is given of a motorcycle on which a drive unit including a transmission is mounted.

Figure 1:
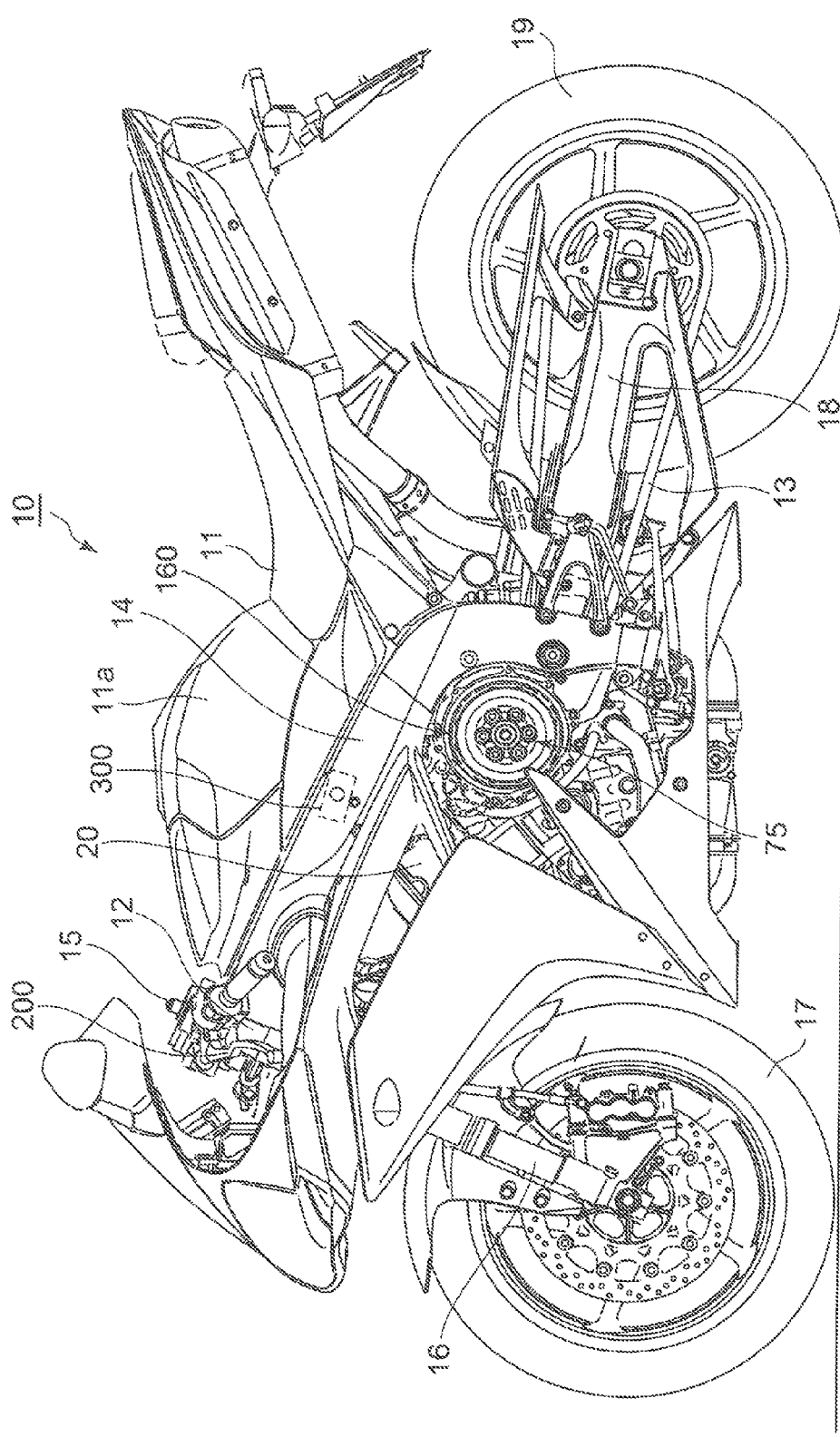
FIG. 1 is a side view of a motorcycle including a transmission according to a preferred embodiment of the present invention.

FIG. 1 is a side view of a motorcycle equipped with the transmission according to the present preferred embodiment. In the motorcycle shown in FIG. 1, a clutch cover that covers a clutch of the transmission is removed, and thus second clutch 75 of transmission mechanism 70 is exposed (see FIG. 2).

As shown in FIG. 1, motorcycle 10 is equipped with main frame 14 that is provided with head pipe 12 at the front end, and that extends rearward while sloping downward. A drive unit including engine 20, transmission mechanism 70, a motor and so forth is located inside main frame 14. Front fork 16, to which handlebar 15 is attached at the top, is provided on head pipe 12 in a turnable manner, and supports front wheel 17 rotatably attached at the lower end of front fork 16.

By-wire clutch lever 200 is attached to handlebar 15. Clutch lever 200 controls the clutch in such a manner that an operation amount is converted to an electrical signal and output to the controller.

As shown in FIG. 1, engine 20 is provided inside main frame 14 at approximately the center portion of the vehicle, with crankshaft 60 (shown in FIG. 2) extending horizontally or approximately horizontally in a direction (a lateral direction) perpendicular or substantially perpendicular to the front-back direction of the vehicle at a position below the cylinder head. At the rear of engine 20, transmission 160 is connected with crankshaft 60 (shown in FIG. 2) to receive power via crankshaft 60.

Rear arm 18 is joined at the rear end side of main frame 14 to extend rearward. The rear end side of main frame 14 is inclined downward. Rear arm 18 supports rear wheel 19 and a driven sprocket (not shown) in a rotatable manner. A driving force is transferred to rear wheel 19 via drive chain 13 running between rear wheel 19 and drive sprocket 76 (see FIG. 2). In motorcycle 10, seat 11 and fuel tank 11a are located above the drive unit, and controller 300 that controls the operation of each section of motorcycle 10 is located between the drive unit and seat 11 or fuel tank 11a. In twin-clutch transmission 100, operations to transfer power of odd-numbered and even-numbered transmission gears (transmission gear mechanism) with a single engine are controlled via controller 300.

Figure 2:
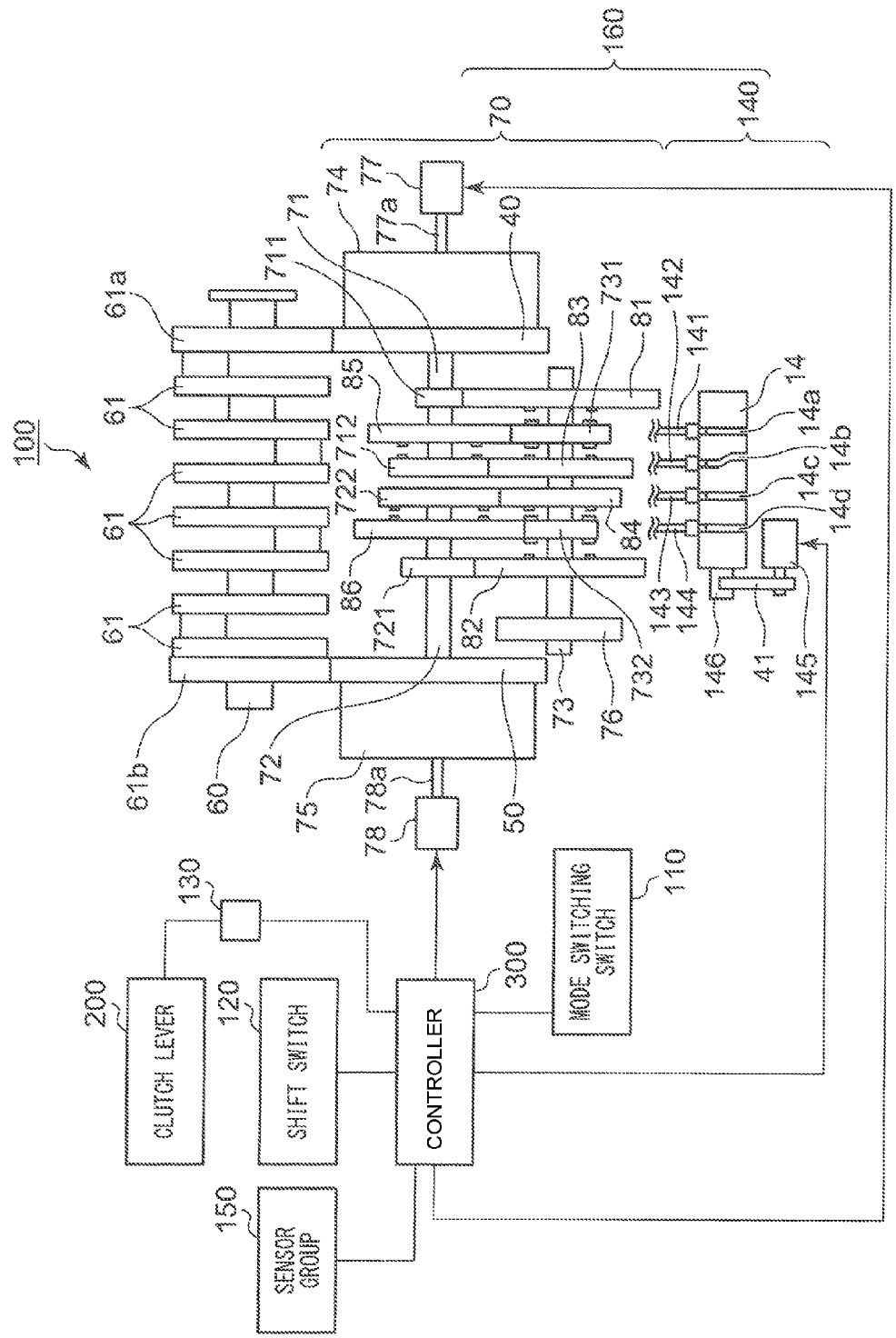
FIG. 2 is a schematic view showing a configuration of a main portion of the transmission according to a preferred embodiment of the present invention.

FIG. 2 is a schematic diagram showing a configuration of a principal portion of the transmission according to a preferred embodiment of the present preferred embodiment. The engine main body is omitted in FIG. 2.

The transmission of the present preferred embodiment is preferably a dual clutch automated manual transmission (DCT) transmission 160, in which a driving force is transferred to an odd-numbered or even-numbered transmission gear by switching between a plurality of clutches (first clutch 74 and second clutch 75). With the transmission of the present preferred embodiment, the driver can perform clutch operations using a clutch lever. Alternatively, it is possible to use a transmission including an AMT or DCT in which the clutch capacity of clutches (first clutch 74 and second clutch 75) of transmission 160 are adjusted with by-wire clutch lever 200.

First, a description is provided for transmission 160 serving as a DCT equipped with clutches 74 and 75, whose capacity is adjusted by clutch lever 200.

As shown in FIG. 2, transmission 160 includes transmission mechanism 70 and shift mechanism 140.

Transmission mechanism 70 is connected with engine crankshaft 60. Transmission mechanism 70 varies the torque transferred from engine crankshaft 60 and transfers it to the rear wheel 19 (see FIG. 1) side. Furthermore, shift mechanism 140 performs torque-varying operations in transmission 160. In a motorcycle, crankshaft 60 is located in a horizontal or approximately horizontal (lateral) direction orthogonal or substantially orthogonal to the front-back direction of the vehicle.

Crankshaft 60 includes a plurality of crank webs 61. Among crank webs 61, crank webs 61a and 61b located at one end and the other end of crankshaft 60 are external gears including gear grooves provided on the outer periphery of the gears.

Crank web 61a meshes with first primary driven gear (also referred to as "first input gear") 40 in first clutch 74. Through this meshing relationship, power transferred to first input gear 40 from crank web 61a at one end of crankshaft 60 is transferred to first main shaft 71 of transmission 160 from one end of crankshaft 60 via first clutch 74.

Also, crank web 61b meshes with second primary driven gear (also referred to as "second input gear") 50 in second clutch 75. Through this meshing relationship, power transferred to second input gear 50 from crank web 61b at the other end of crankshaft 60 is transferred to second main shaft 72 from the other end of crankshaft 60.

First main shaft 71, second main shaft 72, and drive shaft (output shaft) 73 are parallel or substantially parallel to crankshaft 60.

First main shaft 71 and second main shaft 72 are preferably side by side on the same axis line. First main shaft 71 is coupled to first clutch 74, and second main shaft 72 is coupled to second clutch 75.

First clutch 74 and second clutch 75 are separate from each other in a direction orthogonal or substantially orthogonal to the front-back direction of the vehicle (here, in a lateral direction) so as to sandwich first main shaft 71 and second main shaft 72 from either side of the vehicle.

First clutch 74 is preferably a multi-plate friction clutch that transfers rotation power from the engine to first main shaft 71 via crankshaft 60 in an engaged state, and blocks rotation power from the engine to first main shaft 71 in a disengaged state.

First clutch 74 operates in an engaged state and a disengaged state by the driving of first clutch actuator 77. That is, the transfer torque capacity (hereinafter referred to as "torque capacity") of first clutch 74 is changed by the driving of first clutch actuator 77.

Here, first clutch 74 is coupled to first pullrod 77a of first clutch actuator 77, and is placed in an engaged state or disengaged state through forward/backward movement of first pullrod 77a. With first clutch 74, when first pullrod 77a is pulled in a direction away from first clutch 74, a plurality of clutch plates and a plurality of friction plates (not shown) are separated from each other. In this manner, first clutch 74 is placed in a disengaged state, and torque transfer from first input gear 40 to first main shaft 71 is cut off, that is, power transfer from first input gear 40 to first main shaft 71 is blocked. On the other hand, when first pullrod 77a moves toward first clutch 74, the plurality of clutch plates and plurality of friction plates come into close contact with each other. In this manner, first clutch 74 is placed in an engaged state, and torque is transferred to first main shaft 71, that is, power transfer is performed for odd-numbered gears including a group of odd-numbered gears (first gear 81, third gear 83, and fifth gear 85). In this way, with first clutch 74, torque capacity is changed and transfer torque to first main shaft 71 is adjusted according to the degree of pulling of first pullrod 77a.

On the basis of a control command from controller 300, first clutch actuator 77 adjusts the engagement force acting on first main shaft 71 in first clutch 74, that is, the transfer torque from first clutch 74 to first main shaft 71. In this manner, transferring or blocking of power from the engine to first main shaft 71 is performed, and the vehicle starts or stops.

First clutch actuator 77 adjusts the transfer torque of first clutch 74 by hydraulic pressure, for example.

Torque transferred to first main shaft 71 is output from drive shaft 73 via a desired gear pair (a pair from gears 711, 85, and 712 on first main shaft 71 and gears 81, 731, and 83 on drive shaft 73 corresponding to these gears) among the odd-numbered gears (gears 81, 83, 85, 711, 712, and 731).

Second clutch 75 is preferably a multi-plate friction clutch preferably having a configuration the same as that of first clutch 74. Second clutch 75 transfers rotation power from the engine to second main shaft 72 via crankshaft 60 in an engaged state, and blocks rotation power to second main shaft 72 in a disengaged state.

Second clutch 75 operates in an engaged state and a disengaged state through the driving of second clutch actuator 78. That is, the torque capacity of second clutch 75 is changed by the driving of second clutch actuator 78.

Here, second clutch 75 is coupled to second pullrod 78a of second clutch actuator 78, and is placed in an engaged state or disengaged state through forward/backward movement of second pullrod 78a. With second clutch 75, when second pullrod 78a is pulled in a direction away from second clutch 75, a plurality of clutch plates and a plurality of friction plates (not shown) are separated from each other. In this manner, second clutch 75 is placed in a disengaged state, and torque transfer from second input gear 50 to second main shaft 72 is cut off, that is, power transfer from second input gear 50 to second main shaft 72 is blocked. On the other hand, when second pullrod 78a moves toward second clutch 75, the plurality of clutch plates and plurality of friction plates come into close contact with each other. In this manner, second clutch 75 is placed in an engaged state, and torque is transferred to second main shaft 72, that is, power transfer is performed for even-numbered gears including a group of even-numbered gears (second gear 82, fourth gear 84, and sixth gear 86). In this way, with second clutch 75, torque capacity is changed and transfer torque to second main shaft 72 is adjusted according to the degree of pulling of second pullrod 78a.

On the basis of a control command from controller 300, second clutch actuator 78 adjusts the engagement force acting on second main shaft 72 in second clutch 75, that is, the transfer torque from second clutch 75 to second main shaft 72. In this manner, transfer or blocking of power from the engine to second main shaft 72 is performed, and the vehicle starts or stops.

Second clutch actuator 78 preferably has a configuration the same as that of first clutch actuator 77, and drives second clutch 75 by an operation the same as the operation of first clutch actuator 77 for driving first clutch 74.

Furthermore, while the vehicle is moving, first clutch actuator 77 and second clutch actuator 78 perform gear change operations by switching the torque transfer path inside the transmission by operating first clutch 74 and second clutch 75.

Here, first clutch actuator 77 and second clutch actuator 78 are preferably hydraulic, for example, but they may be of any configuration, including electrical, as long as the configuration adjusts the engagement force acting on the clutch.

Torque transferred to second main shaft 72 is output from drive shaft 73 via a desired gear pair (a pair from gears 721, 86, and 722 on second main shaft 72 and gears 82, 732, and 84 on drive shaft 73 corresponding to these gears) among the even-numbered gears (gears 82, 84, 86, 721, 722, and 732).

In this way, power transferred to first main shaft 71 and second main shaft 72 is transferred to drive shaft 73 at a rear portion of the vehicle via gears 81 through 86, 711, 712, 721, 722, 731, and 732 defining appropriately selected transmission gears.

Sprocket 76 is fixed to one end (the left end) of drive shaft 73. Drive chain 13 (see FIG. 1) wound around sprocket 76 is wound around sprocket 76 provided on a rotating shaft of rear wheel 19, and a driving force is transferred from transmission 160 to rear wheel (driving wheel) 19 via drive chain 13 (see FIG. 1) through the rotation of sprocket 76 in association with the rotation of drive shaft 73. In other words, torque generated by the engine is output from drive shaft 73 via first clutch 74 or second clutch 75 and a predetermined gear train corresponding to the relevant transmission gear, and rotates the rear wheel (driving wheel).

The transmitting portion of a driving force output to drive shaft 73 via odd-numbered gears (gears 81, 83, 85, 711, 712, and 731) on first main shaft 71, and the transmitting portion of a driving force output to drive shaft 73 via even-numbered gears (gears 82, 84, 86, 721, 722, and 732) on second main shaft 72, have the same or approximately the same outer diameter. Also, the driving force transmitting portion in first main shaft 71 and the driving force transmitting portion in second main shaft 72 are located so as not to concentrically overlap. In transmission mechanism 70, first main shaft 71 and second main shaft 72 having the same or approximately the same outer diameter are laterally positioned side by side on the same axis line, and rotate independently of each other.

Transmission gears 711, 85, and 712 defining odd-numbered gears are located on first main shaft 71. Specifically, the following gears are arranged on first main shaft 71 in order from the base end to which first clutch 74 is connected: fixed gear (first-equivalent gear) 711, fifth gear 85, and spline gear (third-equivalent gear) 712.

Fixed gear 711 is integral with first main shaft 71, and rotates together with first main shaft 71. Fixed gear 711 meshes with first gear (driven gear) 81 of drive shaft 73, and is also referred to here as "first-equivalent gear."

Fifth gear 85 is attached to first main shaft 71 so as to be rotatable about the axis of first main shaft 71 at a position between first-equivalent gear fixed gear 711 and third-gear spline gear 712 with a distance therebetween in the state where axial movement of fifth gear 85 is regulated.

Fifth gear 85 meshes with spline gear (fifth-equivalent gear as a driven gear) 731 of drive shaft 73.

Spline gear 712 is attached to first main shaft 71 at the front end of first main shaft 71, that is, at the distant end from first clutch 74 such that spline gear 712 is able to move in the axial direction and rotate together with the rotation of first main shaft 71.

Specifically, spline gear 712 is attached to first main shaft 71 so as to be able to slide in the axial direction while its rotation is regulated, by splines provided along the axial direction on the outer periphery of the front end of first main shaft 71. Spline gear 712 meshes with third gear (driven gear) 83 of drive shaft 73. Spline gear 712 is coupled to shift fork 142, and moves on first main shaft 71 in the axial direction through movement of shift fork 142. Spline gear 712 is also referred to here as "third-equivalent gear."

Spline gear 712 moves toward fifth gear 85 on first main shaft 71 and engages with fifth gear 85 to regulate turning (idling) of fifth gear 85 about the axis on first main shaft 71. Through the engagement of spline gear 712 with fifth gear 85, fifth gear 85 is fixed to first main shaft 71 so as to be integrally rotatable together with the rotation of first main shaft 71.

On the other hand, gears 721, 86, and 722 defining even-numbered gears are arranged on second main shaft 720. Specifically, the following gears are arranged on second main shaft 72 in order from the base end to which second clutch 75 is connected: fixed gear (second-equivalent gear) 721, sixth gear 86, and spline gear (fourth-equivalent gear) 722.

Fixed gear 721 is integral with second main shaft 72, and rotates together with second main shaft 72. Fixed gear 721 meshes with second gear (driven gear) 82 of drive shaft 73, and is also referred to here as "second-equivalent gear."

Sixth gear 86 is attached to second main shaft 72 so as to be rotatable about the axis of first main shaft 72 and with its movement regulated in the axial direction, at a position between fixed gear 721 corresponding to the second gear and spline gear 722 corresponding to the fourth gear. Sixth gear 86 meshes with spline gear 732 (sixth-equivalent gear as a driven gear) of drive shaft 73 with a distance therebetween.

Spline gear (fourth-equivalent gear) 722 is attached to second main shaft 72 at the front end of second main shaft 72, that is, at the distant end from second clutch 75 such that spline gear 722 is able to move in the axial direction and rotate together with the rotation of second main shaft 72.

Specifically, spline gear 722 is attached to second main shaft 72 so as to be able to slide in the axial direction while its rotation with respect to second main shaft 72 is regulated by splines provided along the axial direction on the outer periphery of the front end of second main shaft 72. Spline gear 722 meshes with fourth gear (driven gear) 84 of drive shaft 73. Spline gear 722 is coupled to shift fork 143, and moves on second main shaft 72 in the axial direction through movement of shift fork 143.

Spline gear 722 moves toward fifth gear 86 on second main shaft 72 and engages with sixth gear 86, and regulates turning (idling) of sixth gear 86 about the axis on second main shaft 72. Through the engagement of spline gear 722 with sixth gear 86, sixth gear 86 is fixed to second main shaft 72, and is integrally rotatable together with the rotation of second main shaft 72.

Meanwhile, the following gears are arranged on drive shaft 73 in order from the first clutch 74 side: first gear 81, spline gear (fifth-equivalent gear) 731, third gear 83, fourth gear 84, spline gear (sixth-equivalent gear) 732, second gear 82, and sprocket 76.

On drive shaft 73, first gear 81, third gear 83, fourth gear 84, and second gear 82 are provided rotatably about drive shaft 73 in a state in which their movement in the axial direction of drive shaft 73 is inhibited.

Spline gear (also referred to as fifth-equivalent gear) 731 is attached to drive shaft 73 so as to be able to slide in the axial direction while its turning is regulated by spline engagement. That is, spline gear 731 is attached so as to be able to move in a sliding direction with respect to drive shaft 73, and also rotates together with drive shaft 73. Spline gear 731 is coupled to shift fork 141 in shift mechanism 140, and moves on drive shaft 73 in the axial direction through the movement of shift fork 141.

Spline gear (also referred to as sixth-equivalent gear) 732 is attached to drive shaft 73 so as to be able to slide in the axial direction while its turning is regulated by spline engagement. That is, spline gear (sixth-equivalent gear) 732 is attached so as to be able to move in a sliding direction with respect to drive shaft 73, and also rotates together with drive shaft 73. Spline gear 732 is coupled to shift fork 144 in shift mechanism 140, and moves on drive shaft 73 in the axial direction through the movement of shift fork 144.

Sprocket 76 is fixed to the end of drive shaft 73 located on the second clutch 75 side.

Spline gears 712, 722, 731, and 732 function as transmission gears, and also function as dog selectors. Specifically, mutually fitting concave and convex sections are provided on mutually opposing surfaces of spline gears 712, 722, 731, and 732 and transmission gears adjacent in the axial direction, and both gears rotate integrally through the fitting together of the concave and convex sections.

Thus, spline gears 712, 722, 731, and 732 are coupled by a dog mechanism to respective transmission gears (first gear 81 through sixth gear 86) that are adjacent in the axial direction by being moved in the axial direction by coupled shift forks 141 through 144.

Gear shifting performed for gears 81 through 86, 711, 712, 721, 722, 731, and 732 in transmission mechanism 70 is performed by shift forks 141 through 144 that are movable by the rotation of shift cam 14 in shift mechanism 140.

Shift mechanism 140 includes shift forks 141 through 144, shift cam drive unit 146 that provides rotational driving of shift cam 14, motor 145, and drive mechanism 41 that couples motor 145 to shift cam drive unit 146 and transfers the driving force of motor 145 to shift cam drive unit 146.

Shift forks 141 through 144 are installed between spline gears 731, 712, 722, and 732 and shift cam 14, and are spaced a distance from each other in the axial direction of first and second main shafts 71 and 72, drive shaft 73, and shift cam 14. Shift forks 141 through 144 are arranged so as to be parallel or substantially parallel to each other, and are each able to move in the axial direction of the rotation axis of shift cam 14.

Shift forks 141 through 144 include base-end pin sections that are respectively movably located within four cam grooves 14a through 14d provided in the outer periphery of shift cam 14. That is, shift forks 141 through 144 are follower members of shift cam 14 serving as the driving source, and slide in the axial direction of first and second main shafts 71 and 72 and drive shaft 73 in accordance with the shape of cam grooves 14a through 14d of shift cam 14. Due to this sliding movement, spline gears 731, 712, 722, and 732 coupled to the front end each move in the axial direction on shafts passing through the respective inner diameters.

Shift cam 14 is cylindrical, and is arranged so that its rotation axis is parallel or substantially parallel to first main shaft 710, second main shaft 720, and drive shaft 73.

Shift cam 14 is rotated by the driving force of motor 145 transferred to shift cam drive unit 146 via drive mechanism 41. Through this rotation, at least one of shift forks 141 through 144 is moved in the axial direction of the rotating shaft of shift cam 14 in accordance with the shape of cam grooves 14a through 14d.

By shift forks 141 through 144 that move in response to the rotation of shift cam 14 including cam grooves 14a through 14d, a spline gear coupled to a moved shift fork moves, and gear shifting of transmission 160 (transmission mechanism 70) is performed. In other words, motor 145 performs gear shifting by rotating shift cam 14 of shift mechanism 140.

In transmission 160, a driving force of the engine is transferred to drive shaft 73 via two independent systems including first and second main shafts 71 and 72, respectively, by operations of first and second clutches 74 and 75 and operations of shift mechanism 140 corresponding to the operations of first and second clutches 74 and 75. Drive sprocket 76 rotates together with the rotation of drive shaft 73, and rotates rear wheel 19 via a chain.

First clutch 74, second clutch 75, and shift mechanism 140 in transmission 160 are controlled by controller 300 via first clutch actuator 77, second clutch actuator 78, and motor 145. Based on input signals, controller 300 controls the operations of first clutch actuator 77, second clutch actuator 78, and motor 145 at predetermined timings. Through the operations of first clutch actuator 77, second clutch actuator 78, and motor 145 in this way, first clutch 74, second clutch 75, and the gears are operated thus performing gear shifting.

Here, mode switching switch 110 is provided on the left-side handlebar of handlebar 15. Mode switching switch 110 outputs to controller 300 a mode switching signal that requests to change the operation mode in transmission 100.

Here, shift switch 120 is provided on the left-side handlebar of handlebar 15. Shift switch 120 includes a shift-up button (Up) and a shift-down button (Down). When the driver presses the shift-up button or shift-down button of shift switch 120, a signal representing that fact (hereinafter referred to as a "shift signal") is output from shift switch 120 to controller 300.

As shown in FIG. 1, clutch lever 200 is located on the left-side handlebar of handlebar 15, and can be grasped by the driver together with the left-hand grip.

Clutch lever 200 is preferably a by-wire clutch lever. Lever operation amount detector 130 detects the operation amount of clutch lever 200 gripped by the driver (angle θ between the normal state and the operation state of lever body 220 shown in FIG. 3). Lever operation amount detector 130 converts the detected operation amount of clutch lever 200 into an electrical signal and outputs the signal to controller 300.

Controller 300 controls each portion of the vehicle such as transmission 160 and engine 20 (see FIG. 1) based on signals input from mode switching switch 110, shift switch 120, lever operation amount detector 130, and sensor group 150. It is to be noted that the internal configuration and control of controller 300 are described below in detail.

Also, an accelerator opening signal is input to controller 300 from a throttle input potentiometer in sensor group 150. In this manner, controller 300 controls the supply of a fuel-air mixture to the inside of an engine cylinder by controlling a throttle valve of engine 20 (see FIG. 1).

Figure 3:
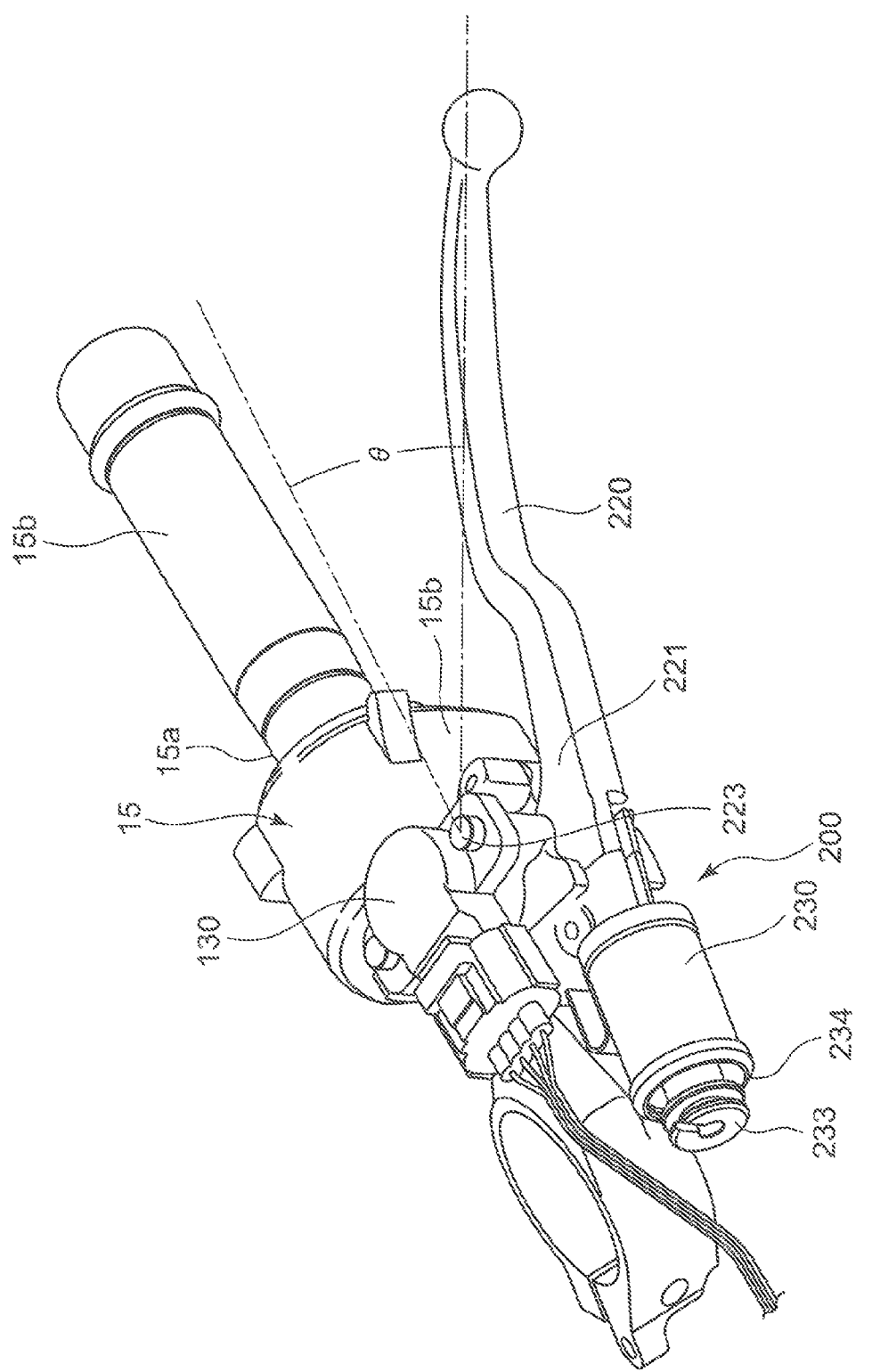
FIG. 3 is a perspective view of a left side handlebar of a handlebar for explaining a clutch lever.

FIG. 3 is a perspective view of a left-side handlebar on a handlebar for explaining clutch lever 200.

As shown in FIG. 3, clutch lever 200 is located opposite grip 15b on left-side handlebar 15a of handlebar 15, and includes lever body 220 to be gripped by the driver. Base end 221 of lever body 220 is rotatably attached to the base of left-side handlebar 15a via shaft 223.

Through rotation of lever body 220, that is, movement of the tip of lever body 220 toward grip 15b, other end 232b of wire 232 inserted inside lever cylinder 230 (see FIGS. 4A and 4B) is pulled.

Figure 4:
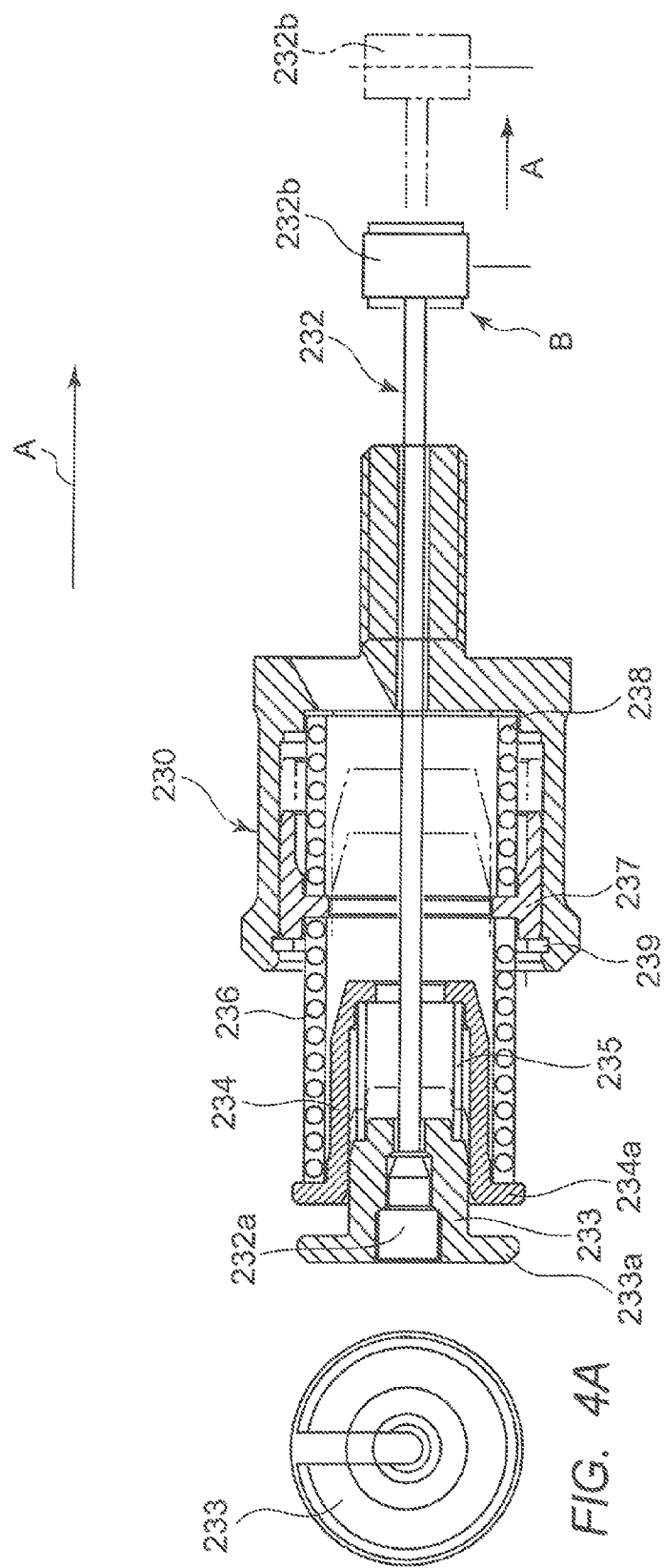
FIGS. 4A and 4B show a configuration of a lever cylinder.

FIGS. 4A and 4B are drawings showing the configuration of a lever cylinder. FIG. 4A is a right side view of the lever cylinder and FIG. 4B is a cross-sectional diagram of the lever cylinder.

As shown in FIGS. 4A and 4B, wire 232 passes through the inside of lever cylinder 230 that is a bottomed cylinder whose one end is closed. Wire 232 is secured to first retainer 233 placed on the bottom side of lever cylinder 230 at one end 232a, and secured to lever body 220 at other end 232b.

First retainer 233 is inserted into second retainer 234 via first coil spring 235, and is movable against the force of first coil spring 235 in the direction of insertion. Movement of first retainer 233 in the direction of insertion is restricted by flange 233a.

Second retainer 234 is inserted inside second coil spring 236, and is latched at one end of second coil spring 236 by flange 234a. Second coil spring 236 is longer than the length of fitting over second retainer 234, and its other end is in contact with free piston 237 placed so as to be able to move in an axial direction inside lever cylinder 230.

Free piston 237 is located inside lever cylinder 230 in a state in which it is biased in the direction lever cylinder 230 is open, that is, toward second coil spring 236, by third coil spring (compression coil spring) 238. Third coil spring 238 is located inside lever cylinder 230 in a preloaded state so as to contract when second coil spring 236 contracts and a force greater than or equal to a predetermined force is obtained. Free piston 237 is restricted by circlip 239 so as not to be ejected from inside lever cylinder 230 by the force of preloaded third coil spring 238.

With clutch lever 200 including the above-mentioned configuration, other end 232b coming out from the axial center of the bottom surface of lever cylinder 230 is engaged at the base end of lever body 220.

When lever body 220 is gripped by the driver and rotates about the base end side by being gripped on the grip 15b side, other end 232b that is at position B in the normal state is pulled in direction A.

In this manner, one end 232a pulls first retainer 233 in direction A, and moves first retainer 233 in direction A against the force of first coil spring 235.

With first retainer 233 moving in direction A, that is, the direction of insertion into second retainer 234, flange 233a pushes flange 234a of second retainer 234, and moves second retainer 234 itself in direction A against the force of second coil spring 236.

Through the movement of second retainer 234 in direction A, a load is also applied to free piston 237 in direction A, but free piston 237 is biased in the direction opposite to direction A by preloaded third coil spring 238. Consequently, third coil spring 238 counteracts second coil spring 236 until second coil spring 236 that has contracted due to the movement of second retainer 234 obtains a predetermined force. As a result, free piston 237 itself does not move in direction A until the force in direction A due to second coil spring 236 becomes greater than the force of third coil spring 238 in the direction opposite to direction A.

Then, when the force in direction A due to second coil spring 236 becomes greater than the force of third coil spring 238 in the direction opposite to direction A, free piston 237 moves in direction A.

Figure 5:
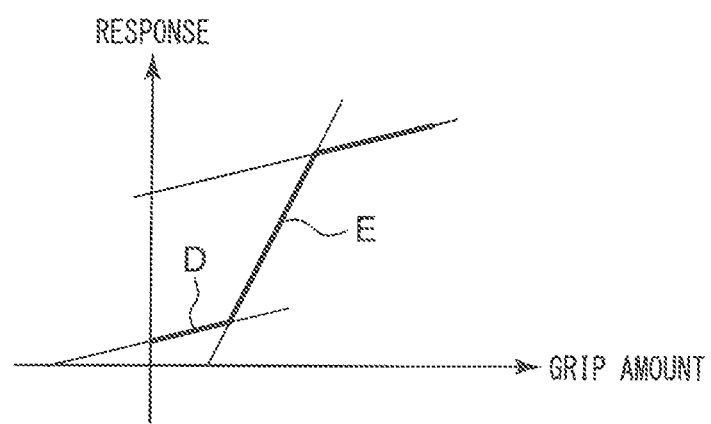
FIG. 5 is a relationship between response and a grip amount of the clutch lever.

FIG. 5 is a drawing showing the relationship between response and grip amount of the clutch lever.

As shown in FIG. 5, at the start of gripping, portion D in which first retainer 233 causes first coil spring 235 to contract has a gradient greater than that of portion E in which second coil spring 236 is made to contract. That is, the force of second coil spring 236 is greater than the force of first coil spring 235, and the portion in which second coil spring 236 is made to contract is set as a portion in which the clutch capacity is changed.

Thus, clutch lever 200 has a configuration in which the increasing rate of operation reaction (response) to an operation amount of lever body 220 changes in at least two stages. With this configuration, it is possible to achieve a so-called force-sense presentation similar to that of operation of a mechanical clutch lever to provide a response similar to that of operation of a mechanical clutch lever.

For example, lever operation amount detector 130 detects the opening at the time when lever body 220 is operated from the normal state, and outputs this to controller 300. In particular, controller 300 performs operations such that the opening of lever body 220 at the time when second coil spring 236 is made to contract corresponds to the clutch torque capacity.

With this configuration, it is possible to give the driver a feeling of play at a portion where second retainer 234 is made to contract, that is, until reaching a predetermined position from the start of gripping as with a clutch lever used in a MT. Therefore, after exerting a light grip at the time of gripping lever body 220, the driver can recognize a position where he or she receives a sudden load, and thus can recognize a range in which he or she receives the sudden load as a range in which clutch torque capacity is adjusted.

Figure 6:
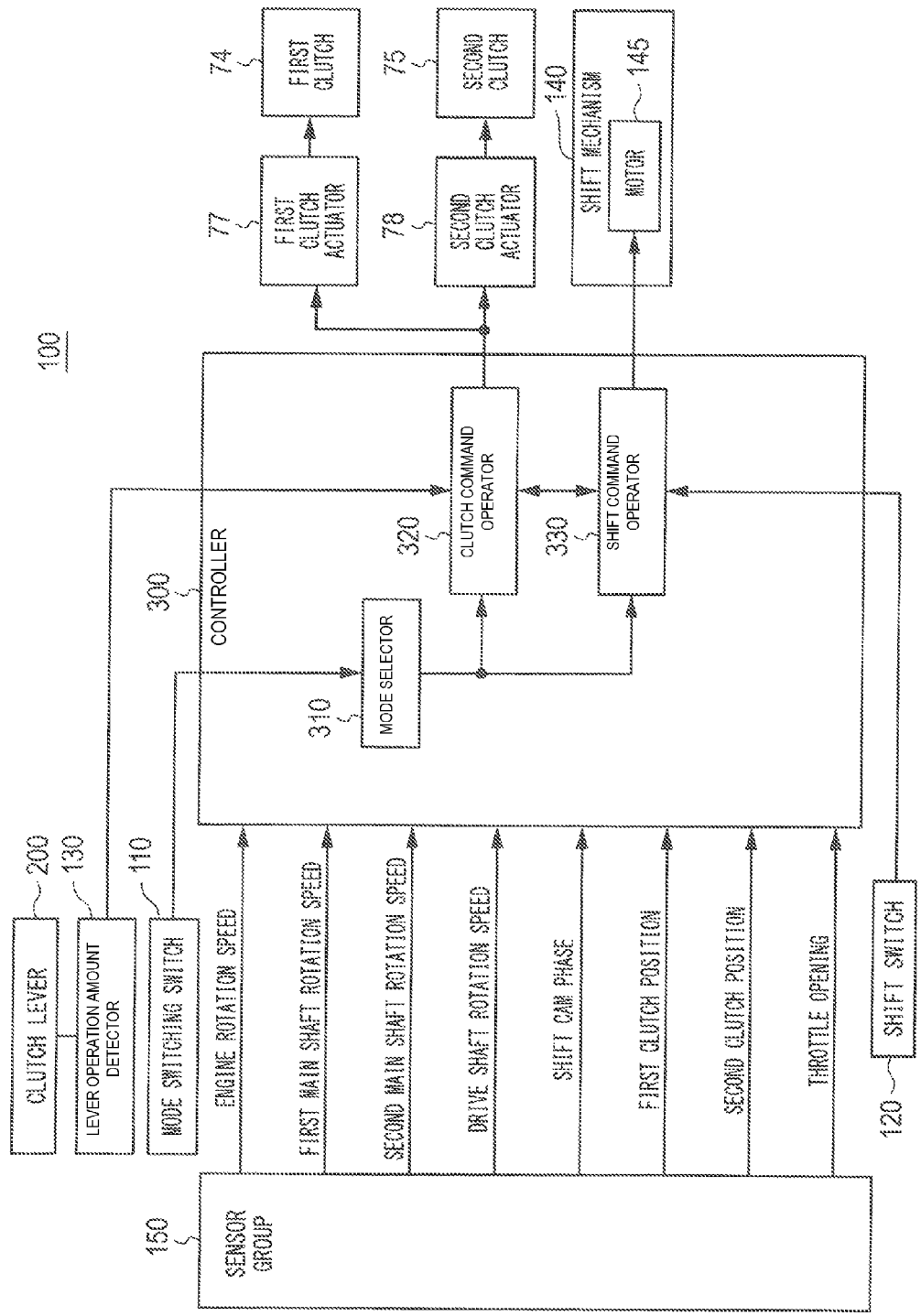
FIG. 6 is a block diagram showing a configuration of a controller of the transmission according to a preferred embodiment of the present invention.

Next, the internal configuration and control of controller 300 are described in detail with reference to FIG. 6. FIG. 6 is a block diagram for explaining a controller of transmission 100 according to the present preferred embodiment.

In twin-clutch transmission 100 shown in FIG. 6, controller 300 includes a TCU (Transmission Controller) function and an ECU (Engine Controller) function.

Controller 300 controls transmission 160 using mode switching switch 110, shift switch 120, lever operation amount detector 130, and information input from sensor group 150.

Controller 300 detects the driving state of the vehicle based on information input from sensor group 150. The information input from sensor group 150 includes the engine rotation speed, first main shaft rotation speed, second main shaft rotation speed, drive shaft rotation speed, shift cam phase, first clutch position, second clutch position, and accelerator position.

The shift cam phase indicates the phase angle of shift cam 14 rotating through the operation of motor 145 of shift mechanism 140. Controller 300 determines the transmission gear (first gear to sixth gear, and N (neutral)) from the phase angle of shift cam 14.

Also, the first clutch position and second clutch position indicate a state of engagement of first clutch 74 by first clutch actuator 77 and a state of engagement of second clutch 75 by second clutch actuator 78. The first clutch position and second clutch position are detected by clutch angle sensors in sensor group 150. Specifically, the first clutch position indicates the amount of separation between the plurality of clutch plates and the plurality of friction plates in first clutch 74 adjusted by first pullrod 77a (see FIG. 2), that is, the engagement state of first clutch 74, and the second clutch position indicates the amount of separation between the plurality of clutch plates and the plurality of friction plates in second clutch 75 adjusted by second pullrod 78a (see FIG. 2), that is, the engagement state of second clutch 75. Torque output via the clutches is changed by changes in these clutch positions.

Controller 300 includes mode selector 310, clutch command operator 320, and shift command operator 330.

When receiving a mode switching signal from mode switching switch 110, mode selector 310 selects the operation mode of the transmission system (the AT mode, the AMT mode, or the MT mode) based on the accelerator opening, the operation amount of clutch lever 200, and the vehicle control state (under start control or not), and outputs a mode signal representing the selected operation mode to clutch command operator 320 and shift command operator 330. It is to be noted that details of the selection control of mode selector 310 are described below.

At the time of starting/stopping in the MT mode, clutch command operator 320 calculates a transmission torque capacity (clutch torque capacity) of the clutch (first clutch 74 and second clutch 75) in accordance with the operation of clutch lever 200, and controls the driving of first clutch actuator 77 and second clutch actuator 78 based on the clutch torque capacity.

At the time of starting/stopping in the AT mode and at the time of starting/stopping in the AMT mode, clutch command operator 320 controls the driving of first clutch actuator 77 and second clutch actuator 78 such that the clutch is automatically disconnected in accordance with the operation of shift switch 120 (N→1, 1→N).

At the time of transmission in each operation mode, clutch command operator 320 automatically calculates the clutch torque capacity with the use of information input from sensor group 150 and information from internally stored predetermined programs and maps, and controls the driving of first clutch actuator 77 and second clutch actuator 78 based on the clutch torque capacity.

Clutch command operator 320 calculates the torque of first main shaft 71, second main shaft 72, and drive shaft 73 by differentiating the first main shaft rotation speed, second main shaft rotation speed, and drive shaft rotation speed, respectively. The drive shaft rotation speed corresponds to the vehicle speed. Clutch command operator 320 calculates a clutch torque capacity with the use of torque of first main shaft 71, torque of second main shaft 72, torque of drive shaft 73, and information representing an engine operation state provided from ECU corresponding to a gear ratio of each transmission gear set in advance.

In the MT mode, at the time of starting/stopping in the AT mode and in the AMT mode, shift command operator 330 selects a destination gear in accordance with a shift signal output from shift switch 120, and controls the driving of shift mechanism 140 (motor 145) such that the gear is shifted to the selected gear.

At the time of transmission in the AT mode, shift command operator 330 automatically selects a destination gear with the use of information input from sensor group 150 and information from internally stored predetermined programs and maps, and controls the driving of shift mechanism 140 (motor 145) such that the gear is shifted to the selected gear.

With the coordinated control of clutch command operator 320 and shift command operator 330, first clutch 74 or second clutch 75 or both is/are disengaged, shift cam 14 is rotated, and gear shifting of transmission 160 (to be precise, transmission mechanism 70) is performed.

As a result, at the time of transmission in the AT mode, transmission 100 automatically performs all of a series of operations of gear selection, clutch disconnection, gear shift, and clutch connection ("clutch/shift operation") regardless of whether shift switch 120 and clutch lever 200 are operated (automatic transmission).

At the time of transmission in the MT mode and transmission in the AMT mode, transmission 100 selects a destination gear in accordance with the operation of shift switch 120, and performs a clutch/shift operation to shift the gear to the selected gear regardless of whether clutch lever 200 is operated (switch transmission).

When shift switch 120 is operated during driving in the AT mode, transmission 100 selects a destination gear as a temporary interrupt in accordance with the operation of shift switch 120, performs the clutch/shift operation to shift the gear to the selected gear, and cancels the interrupt by a predetermined program stored in mode selector 310 to continue the operation in the AT mode.

In each operation mode, during the clutch/shift operation, transmission 100 does not receive the operation of shift switch 120.

At the time of starting/stopping in the MT mode, transmission 100 disconnects the clutch in accordance with the operation of clutch lever 200, and in that state, performs gear shifting (N→1, 1→N) in accordance with the operation of shift switch 120 (lever start/stop). At the time of starting/stopping in the MT mode, even when shift switch 120 is operated in the state where the clutch is not disconnected, shift change of gears is interlocked (inhibited).

At the time of starting/stopping in the AT mode and at the time of starting/stopping in the AMT mode, transmission 100 disconnects the clutch in accordance with the operation of shift switch 120 (N→1, 1→N) regardless of the operation of clutch lever 200, and in that state, performs gear shifting (N→1, 1→N) (automatic start/stop).

When clutch lever 200 is operated at the time of transmission, clutch command operator 320 reflects the operation amount of clutch lever 200 (the operation amount of the lever) to the clutch torque capacity for driving first clutch actuator 77 and second clutch actuator 78.

In the present preferred embodiment, clutch command operator 320 cuts off the automatically calculated clutch torque capacity ("automatic torque capacity") in accordance with the amount of lever operation.

Figure 7:
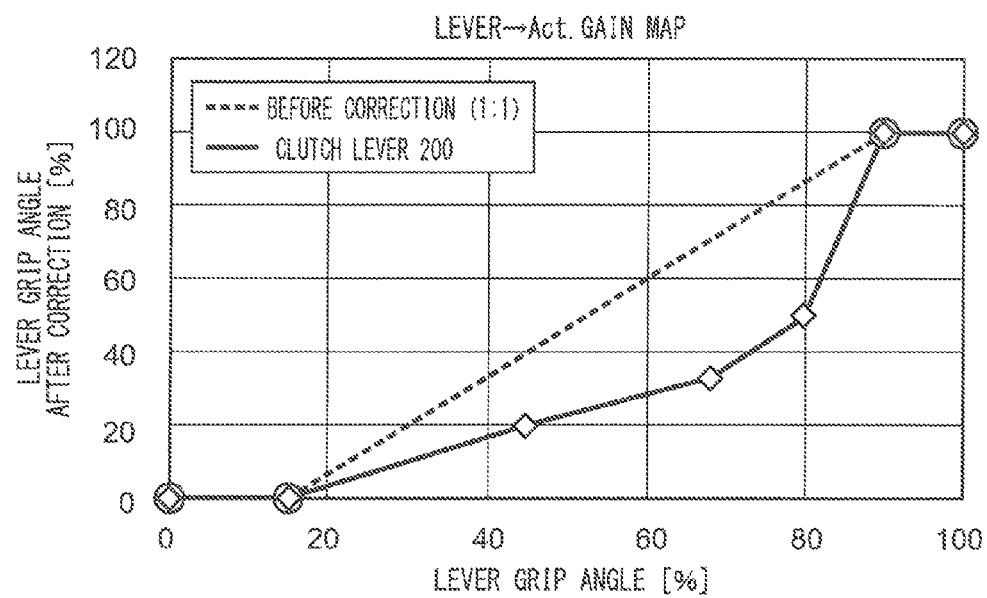
FIG. 7 is a gain map showing a grip angle of the clutch lever and a grip angle of the lever after correction.
Figure 8:
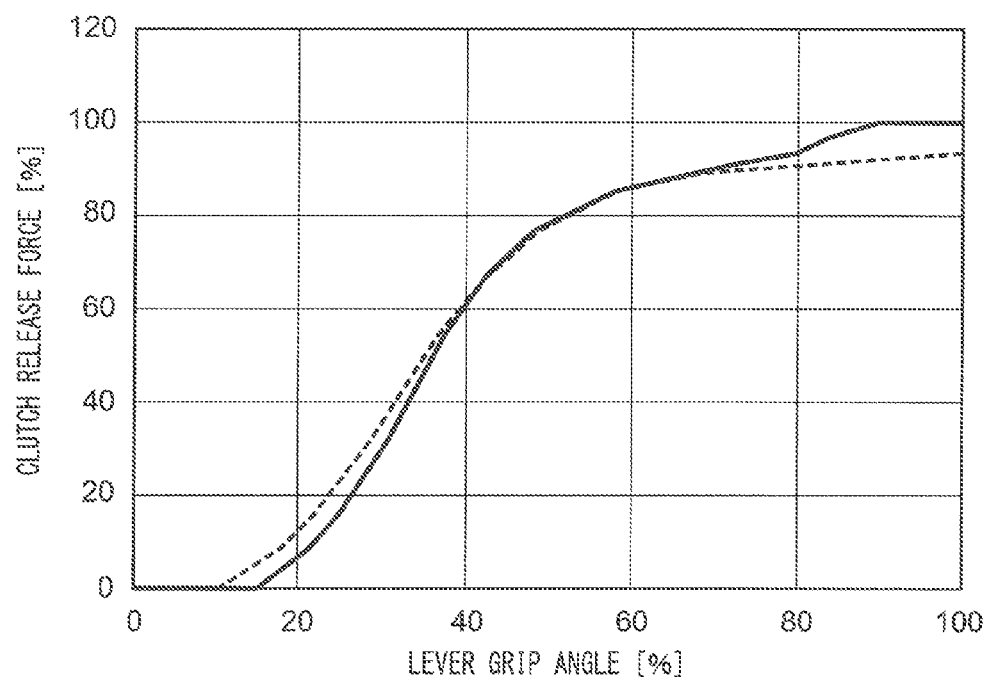
FIG. 8 shows release force of the clutch that is controlled using a grip angle of the clutch lever after correction.

A clutch torque capacity corresponding to an operation amount of clutch lever 200 is converted using the gain map shown in FIG. 7, and is determined as a value satisfying the relationship shown in FIG. 8. FIG. 7 is a gain map showing an angle of clutch lever 200 and a lever grip angle after correction. FIG. 8 shows the release force (engagement state) of a clutch controlled using a grip angle (operation amount) for clutch lever 200 after correction. In FIG. 8, the relationship (solid line) between a grip angle of clutch lever 200 after correction and clutch lever release force approximates the nonlinear relationship (broken line) between the grip angle and the clutch release force of a mechanical clutch lever. In the setting of FIG. 8, the clutch is engaged when the clutch release force is preferably within a range of about 60% to about 80%, for example.

Figure 9:
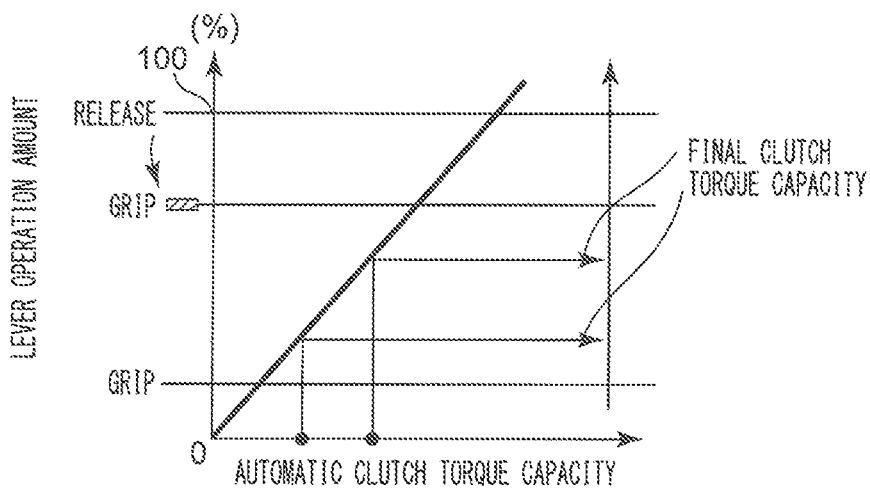
FIG. 9 shows a relationship between an operation amount of the lever and the clutch torque capacity.

FIG. 9 shows a relationship between the operation amount of the lever and the clutch torque capacity. For convenience, FIG. 9 shows a case in which a clutch torque capacity is output to one of first and second clutch actuators 77 and 78 (also referred to simply as "clutch actuator") to drive either first clutch 74 or second clutch 75. Furthermore, in FIG. 9, regarding the lever operation amount, a state in which lever body 220 is fully released is defined as a 100% opening and a state in which lever body 220 is fully gripped is defined as a 0% opening.

As shown in FIG. 9, at the time of transmission, clutch command operator 320 automatically calculates the clutch torque capacity. When clutch lever 200 is not operated, clutch command operator 320 controls the clutch actuator based on the automatic torque capacity. When clutch lever 200 is operated, the operation amount of the lever is input to clutch command operator 320 from lever operation amount detector 130. According to the degree of the operation amount of the lever (the degree of grip), a limit line (a line indicating a maximum value of the clutch torque capacity that varies in accordance with the operation amount of the lever) fluctuates on the Y axis. When the limit line is lower than the automatic torque capacity, the limit value is the maximum value of the clutch torque capacity, and the final clutch torque capacity. That is, the maximum value of the clutch torque capacity is adjusted with the operation amount of the lever, and the clutch torque capacity is restricted.

Based on operation of clutch lever 200, clutch command operator 320 determines as a final clutch torque capacity a total or approximately total torque capacity after gear ratio conversion for first clutch 74 and second clutch 75.

Clutch command operator 320 may determine as a final clutch torque capacity a maximum value of a total torque capacity after gear ratio conversion for first clutch 74 and second clutch 75, based on operation of clutch lever 200.

Figure 10:
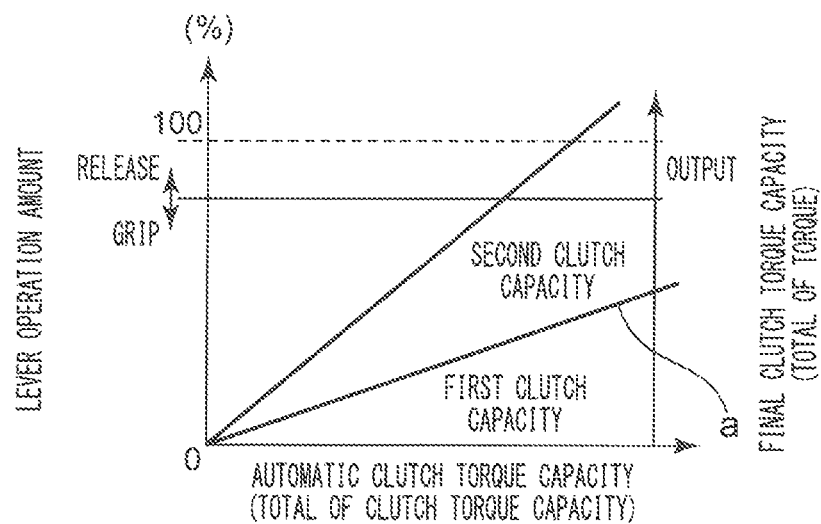
FIG. 10 shows a relationship between an operation amount of the lever and a total clutch torque capacity.

With reference to FIG. 10, operation for a total of the torque capacity of first clutch 74 and second clutch 75 after gear ratio conversion is described. FIG. 10 shows a relationship between an operation amount of the lever and a total clutch torque capacity. In FIG. 10, regarding the amount of clutch lever operation, a state in which lever body 220 is fully released is defined as a 100% opening and a state in which lever body 220 is fully gripped is defined as a 0% opening.

An automatic torque capacity shown in FIG. 10 corresponds to a total value of a clutch capacity of first clutch 74 and a clutch capacity of second clutch 75 shown by an area delimited by gradient a that varies according to the ratio of gear ratios.

As shown in FIG. 10, at the time of transmission, clutch command operator 320 automatically calculates a clutch torque capacity that is the total of the torque capacity of first clutch 74 and second clutch 75. An automatic torque capacity is a total of the torque capacity of first clutch 74 and second clutch 75 after the gear ratio is converted, that is, when conversion on crankshaft 60 or drive shaft 73 is performed.

These are calculated based on information input from sensor group 150. When clutch lever 200 is not operated, clutch command operator 320 controls the clutch actuator based on the automatic torque capacity.

When clutch lever 200 is operated, the operation amount of the lever is input to clutch command operator 320 from lever operation amount detector 130. According to the degree of the input operation amount of the lever (the degree of grip), a limit line (a line indicating a maximum value of a clutch capacity that varies in accordance with an amount of lever operation) fluctuates on the Y-axis. When the limit line is lower than the automatic torque capacity, the limit value is the maximum value of the clutch torque capacity, and the final clutch torque capacity. That is, the maximum value of the clutch torque capacity is adjusted by the operation amount of the lever, and the clutch torque capacity is restricted.

Figure 12:
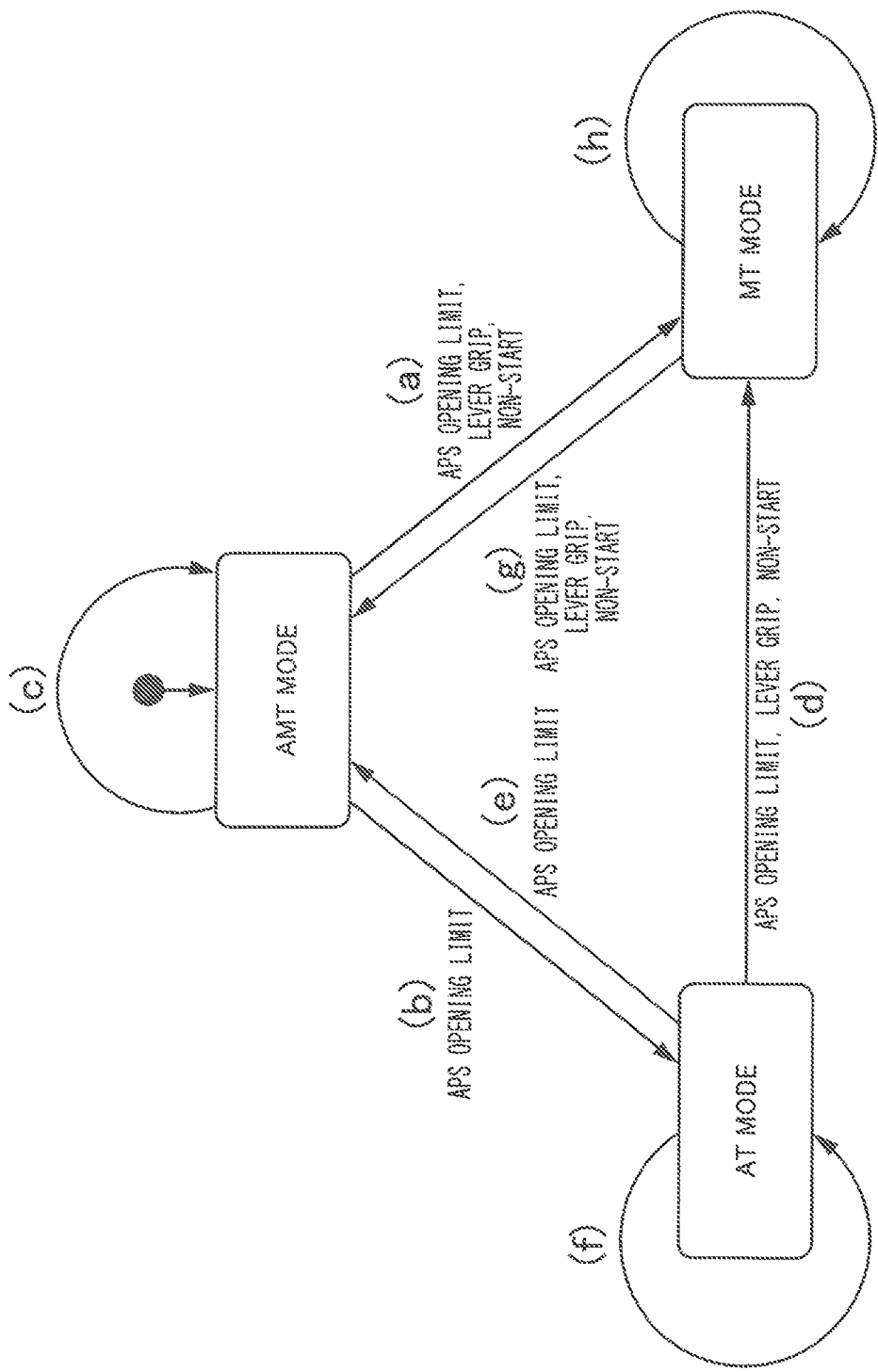
FIG. 12 shows mode transition of the transmission according to a preferred embodiment of the present invention.

FIG. 12 shows driving modes of transmission 100 according to a preferred embodiment of the present invention. In FIG. 12, "●" means "operation by the driver," and "●/time" means that the operation is automatically performed when no driver's operation has been performed for a predetermined period. In addition, "excellent," "good," and "fair" represent the degrees of response of respective items.

"AT Mode"
Start

When the driver presses shift switch 120 to request "N→first gear (indicated by "N→1" in the drawing)," transmission 100 disengages clutches to perform an N→first gear change, and then stands by. When the driver opens the accelerator, transmission 100 engages the clutches based on the accelerator opening to start the vehicle.

Transmission

Transmission 100 automatically performs gear selection and a clutch/shift operation (clutch connection, gear shifting, and clutch disconnection) to perform gear changes. It is to be noted that the driver's operation of clutch lever 200 and shift switch 120 is not required.

Stop

When the vehicle speed decreases, transmission 100 automatically performs a down-shift such that a gear change to first gear is completed before the vehicle stops. When the vehicle speed further decreases, the transmission 100 stops the vehicle by automatically disengaging the clutches. At this time, when the driver presses shift switch 120 to request "1→N," transmission 100 makes a "1→N" gear change and then engages the clutches.

"AMT Mode"
Same Start and Stop as Those of AT Mode
Transmission

When the driver presses shift switch 120, transmission 100 changes the gear by performing gear selection and a clutch/shift operation such that the gear is shifted to a destination gear. At the time of shift-down in the AMT mode, the gear may be automatically changed as with AM mode.

"MT Mode"
Start

When the driver grips clutch lever 200 in N (neutral), transmission 100 disconnects the clutch. Thereafter, when the driver presses shift switch 120 to request "N→first gear," transmission 100 disconnects the clutch to perform an N→first gear change and then stands by. Thereafter, when the driver releases the clutch lever 200 in the state where the accelerator is open, transmission 100 connects the clutches to start the vehicle.

Transmission

When the driver presses shift switch 120, transmission 100 changes the gear by performing the clutch/shift operation such that the gear is shifted to the destination gear.

Stop

When the driver grips clutch lever 200, transmission 100 disconnects the clutch. When the vehicle is braked in this state, the vehicle is stopped.

As shown in FIG. 11, at the time of starting in the MT mode, the driver has to perform three operations, an operation of shift switch 120, an operation of the accelerator, and an operation of clutch lever 200. This makes it possible to improve the erroneous start prevention performance as compared with the AT mode and the AMT mode.

In addition, the ability to manipulate the engagement state (clutch torque capacity) of first clutch 74 and second clutch 75 via by-wire clutch lever 200 makes it possible to improve the degree of freedom of acceleration at the time of starting.

In addition, in the MT mode, a threshold value of an operation amount of clutch lever 200 is set, and, depending on the gear, the shift change operation is prohibited (interlocked) so that the gear cannot be changed when clutch lever 200 is not gripped.

Here, in the MT mode, a predetermined operation amount (grip) of clutch lever 200 is required when the gear is changed from N up to first gear and when the gear is changed from first gear down to N.

In this manner, in the MT mode, it is possible to prevent a situation from occurring in which the gear is shifted to first gear from N with the clutch being connected at the time of starting and the vehicle is moved. In addition, in the MT mode, unintended gear change from first gear to N while the vehicle is moving is prevented.

Next, with reference to FIG. 12, details of mode selection by mode selector 310 in controller 300 are described. FIG. 12 shows conditions of mode transition.

At the time when the operation is started (when the ignition key is turned from OFF to ON), mode selector 310 selects the AMT mode. In addition, when a mode switching signal is received from mode switching switch 110, mode selector 310 determines whether the accelerator opening is not greater than a prescribed value, whether the amount of the lever operation is not smaller than a threshold, and whether the start control is being performed, and selects the operation mode in accordance with a result of the determination. Whether the start control is being performed is preferably determined by a flag in the software that is executed by controller 300.

To be more specific, in the case where a mode switching signal is input in the AMT mode, mode selector 310 selects: (a) the MT mode when the accelerator opening is not greater than the prescribed value (ASP opening limit), the amount of lever operation is not smaller than a threshold (lever grip), and start control is not being performed (non-start); (b) the AT mode when the accelerator opening is not greater than the prescribed value and the amount of lever operation is smaller than a threshold, or start control is being performed; and (c) the AMT mode when the accelerator opening is greater than the prescribed value (operation mode is not transferred).

In addition, in the case where a mode switching signal is input in the AT mode, mode selector 310 selects: (d) the MT mode when the accelerator opening is not greater than the prescribed value, the operation amount of the lever is not smaller than a threshold, and start control is not being performed; (e) the AMT mode when the accelerator opening is not greater than a prescribed value and the operation amount of the lever is smaller than a threshold, or start control is being performed; and (f) the AT mode when the accelerator opening is greater than the prescribed value (operation mode is not transferred).

In addition, in the case where a mode switching signal is input in the MT mode, mode selector 310 selects: (g) the AMT mode when the accelerator opening is not greater than the prescribed value, and the operation amount of the lever is not smaller than a threshold, and start control is not being performed; and (h) the MT mode in the cases other than (g) (operation mode is not transferred). It is to be noted that, in a preferred embodiment of the present invention, the AT mode may be selected in the case of (g).

As described above, in a preferred embodiment, the mode selection control is performed such that, when performing transition between the AT mode and the MT mode or between the AMT mode and the MT mode, the driver at least has to operate mode switching switch 110 while operating clutch lever 200 in an operation amount not smaller than a predetermined threshold.

In this manner, unintended transition between the AT mode and the MT mode or between the AMT mode and the MT mode (malfunction) with the clutch being connected is prevented.

In addition, the condition that start control is not being performed is added to the conditions of transition between the AT mode and the MT mode or between the AMT mode and the MT mode, and thus abrupt behavior of the vehicle at the time of starting is prevented.

In addition, the condition that the accelerator opening is not greater than the prescribed value is added to the conditions of transition among the operation modes, and thus abrupt behavior of the vehicle at the time of starting is prevented. It is to be noted that, the prescribed value may differ depending on the gear ratio (for example, values of respective first to sixth gears).

Controller 300 may display a current operation mode on an instrument panel. For example, a mode display lamp is turned off in the MT mode, turned on in the AT mode, and blinking in the AMT mode. In this manner, the driver can recognize the current operation mode.

After power is switched on, controller 300 learns a signal range input from lever operation amount detector 130 such that an output clutch torque capacity command value corresponds to an operation amount of clutch lever 200.

That is, controller 300 learns an operation range of clutch lever 200 including a lever grip position and release position by using a signal range output as the operation amount of the lever from lever operation amount detector 130 accompanying lever opening and closing operations, and reflects this in a final clutch torque capacity command value.

It is to be noted that, in the MT mode, if there is no signal input to controller 300 from lever operation amount detector 130, and controller 300 determines that lever operation amount detector 130 has failed, the mode is changed to the AMT mode. In this manner, movement of the vehicle is able to be continued without degrading functionality in the event of a lever failure. Failure of lever operation amount detector 130 by controller 300 is determined based on the state of the electrical connection to lever operation amount detector (so-called potentiometer) 130.

Figure 13:
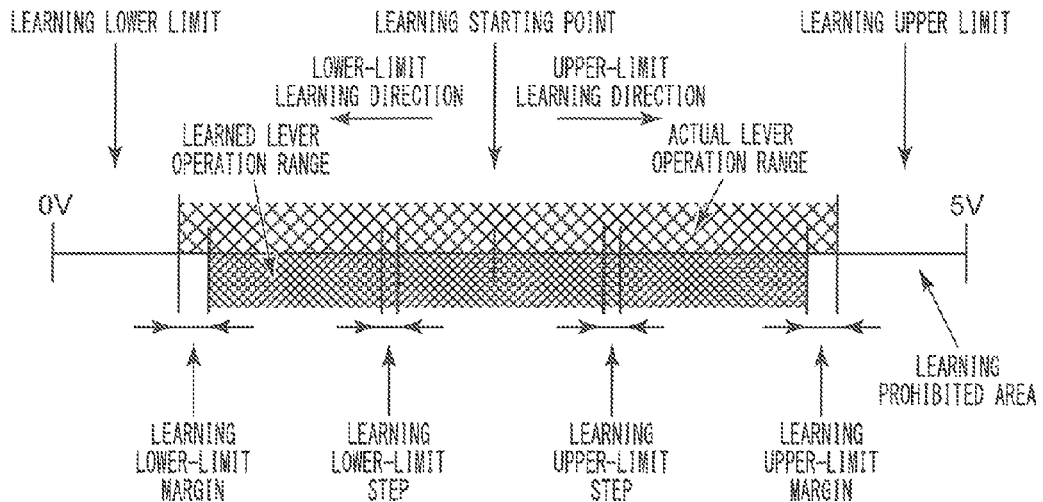
FIG. 13 is a drawing for describing learning of an operation range of the clutch lever.

FIG. 13 is a drawing for explaining learning of a clutch lever operation range by a controller.

In FIG. 13, the horizontal axis represents final clutch torque capacity command values 0 V to 5 V corresponding to the opening/closing range of clutch lever 200.

The learning start position is the center position of the learned lever operating range (the learning starting point), and an upper-limit step and lower-limit step are set in advance on either side of this position. Controller 300 starts learning from the center position, begins to learn from a point at which the previously set upper-limit step is exceeded in the learning upper-limit range through gripping of clutch lever 200, and terminates learning when the lever reaches the upper limit of the actual lever operation range. A lower limit is able to be learned in a similar way through release of the gripped lever. Since the lever operation range is able to be learned in specific step units in this way, a full grip position is able to be learned in one clutch lever 200 gripping operation. The learning upper-limit margin and learning lower-limit margin areas shown in FIG. 13 are to prevent opening not returning to 0% or not reaching 100% due to the learning progress situation.

With a vehicle equipped with transmission 100, at the time of starting, clutch lever 200 is firmly gripped once in order to change from N up to first gear. This one-time gripping of clutch lever 200 enables the operation range to be learned, so that a clutch actuator can be operated in an optimal position when the driver next performs a clutch operation using clutch lever 200.

Figure 14:
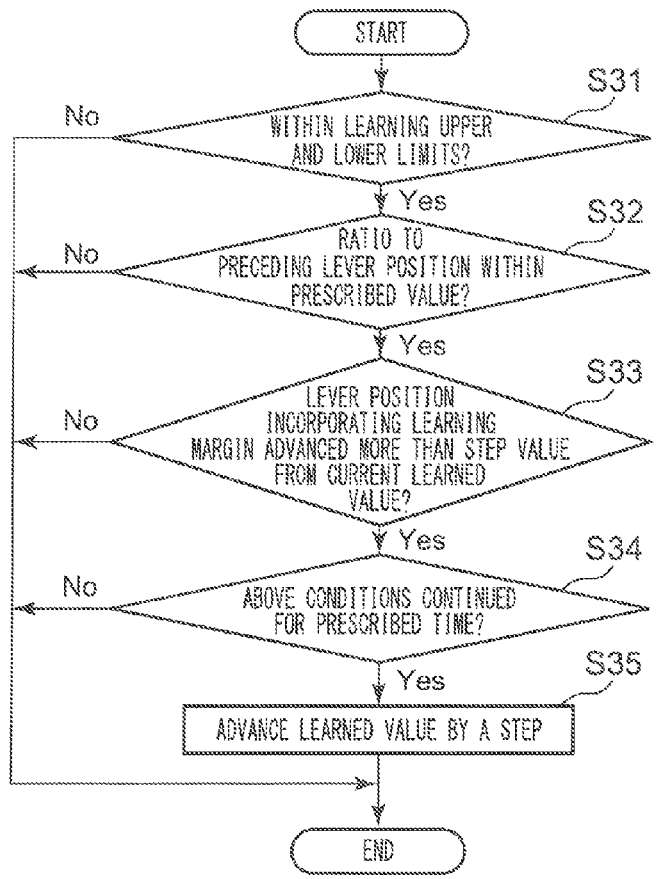
FIG. 14 is a flowchart for describing learning of the operation range of the clutch lever.

FIG. 14 is a flowchart for explaining learning of a clutch lever operation range. When the clutch lever 200 operating range is learned, "+" with respect to the current lever position indicates the lower-limit learning side, and "−" the upper-limit learning side.

As shown in FIG. 14, controller 300 first sets an upper-limit step and lower-limit step when power is switched on, and proceeds step-by-step with learned value acquisition by satisfying the following conditions. That is, step-by-step learned value acquisition proceeds by satisfying the following conditions: the clutch lever 200 position is within the learning upper and lower limits (step S31), the ratio to the preceding clutch lever 200 lever position is within a prescribed value (step S32), the lever position incorporating a learning margin (current lever position±learning margin) has advanced more than the step value from the current learned value (step S33), and these (step S31 through step S33) conditions have continued (step S34) for a prescribed time (step S35).

In a preferred embodiment of the present invention, even with DCT, the manner in which a driving force is restored when changing gears is able to be adjusted by operating clutch lever 200. For example, in the case where a child or elderly person is also mounted on the vehicle, torque capacity is able to be increased slowly and output driving force can be increased gradually at the time of clutch re-engagement for changing gears. In this manner, it is possible to give the fellow passenger a comfortable driving feeling. Also, the driving force is able to be adjusted without an accompanying gear change. For example, when a vehicle in which a transmission 100 is mounted is in a traffic jam or is moving alongside a pedestrian, the vehicle is able to run in a half-clutch state without gear changes being performed.

Furthermore, the driving force at the time of starting is able to be adjusted. For example, a quick start is able to be achieved by performing clutch engagement after the engine rotation speed is first increased by depressing the accelerator.

Also, in the event of wheelie, the driver can perform a quick clutch release to prevent the wheelie from continuing.

In a preferred embodiment described above, a configuration has been described in which the driver performs a gear change preferably with shift switch 120, but as long as the driver can perform gear changes, gear changes are not limited to this and may be performed with a shift pedal, shift lever, shift handle, or the like. Also, mode switching switch 110 is not limited as long as the driver can perform gear changes, and may include a mode switching lever, mode switching pedal, mode switching paddle, mode switching button, or the like.

Also, in a preferred embodiment described above, transmission 100 has been described as operating a plurality of clutches preferably via by-wire clutch lever 200, but this is not a limitation, and a single clutch may also be used.

The present invention is not limited to the above-described preferred embodiments, and various variations and modifications may be possible without departing from the scope of the present invention.

Various preferred embodiments of the present invention are suitable for motorcycles and vehicles such as ATVs in which gear changes of a MT system, an AT system, and an AMT system can be performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A transmission comprising:
clutch actuators that disengage a clutch of a multi-speed transmission;
a shift actuator that performs gear shifting of the multi-speed transmission;
a controller that controls the clutch actuators and the shift actuator;
a clutch lever;
a lever operation amount detector that converts an operation amount of the clutch lever to an electrical signal and outputs the electrical signal to the controller; and
a shift switch that outputs a command of gear shifting by a driver to the controller; wherein
the controller performs control in an AMT mode, an AT mode, or a MT mode;
the AMT mode is an operation mode in which a series of shift change operations are performed by controlling the clutch actuators and the shift actuator in a coordinated manner when the shift change command is input by an operation of the shift switch by the driver, and the clutch actuator is controlled regardless of an operation of the clutch lever by the driver in a starting process and a stopping process;
the AT mode is an operation mode in which shift selection and the series of shift change operations are performed by controlling the clutch actuators and the shift actuator regardless of the operation of the shift switch by the driver, and the clutch actuator is controlled regardless of the operation of the clutch lever by the driver in the starting process and the stopping process;
the MT mode is an operation mode in which the series of shift change operations are performed by controlling the clutch actuators and the shift actuator in a coordinated manner when the shift change command is input by the operation of the shift switch by the driver, and the clutch actuators are controlled such that the clutch is operated with a clutch torque capacity corresponding to the operation of the clutch lever by the driver in at least one of the starting process and the stopping process;
a mode switching switch outputs a request to change the operation mode by the driver to the controller; and
the controller performs a mode selection control such that, when performing a mode transition between the AT mode and the MT mode or between the AMT mode and the MT mode, the driver at least has to operate the mode switching switch while operating the clutch lever with an operation amount not smaller than a predetermined threshold and an accelerator opening is not greater than a prescribed value.

2. The transmission according to claim 1, wherein the controller includes a condition that a start control is not being performed to the mode transition between the AT mode and the MT mode or between the AMT mode and the MT mode.

3. The transmission according to claim 2, wherein, when receiving the request to change the operation mode in the AMT mode, the controller selects:
the MT mode when the accelerator opening is not greater than the prescribed value, the operation amount of the lever is not smaller than the threshold, and a start control is not being performed;
the AT mode when the accelerator opening is not greater than the prescribed value and the operation amount of the lever is smaller than the threshold, or the start control is being performed; or
the AMT mode when the accelerator opening is greater than the prescribed value.

4. The transmission according to claim 2, wherein, when receiving the request to change the operation mode in the AT mode, the controller selects:
the MT mode when the accelerator opening is not greater than the prescribed value, the operation amount of the lever is not smaller than the threshold, and the start control is not being performed;
the AMT mode when the accelerator opening is not greater than the prescribed value and the operation amount of the lever is smaller than the threshold, or the start control is being performed; or
the AT mode when the accelerator opening is greater than the prescribed value.

5. The transmission according to claim 2, wherein, when receiving the request to change the operation mode in the MT mode, the controller selects:
the AMT mode when the accelerator opening is not greater than the prescribed value, the operation amount of the lever is not smaller than the threshold, and the start control is not being performed; or the MT mode when the accelerator opening is greater than the prescribed value, the operation amount of the lever is smaller than the threshold, or the start control is being performed.

6. The transmission according to claim 2, wherein the controller selects the AMT mode at a time of starting.

7. The transmission according to claim 1, wherein transmission is a dual clutch transmission with a first clutch operated by a first clutch actuator and a second clutch operated by a second clutch actuator.

8. A vehicle comprising:
the transmission according to claim 1.

9. A motorcycle comprising:
the transmission according to claim 1.

10. A method, performed by a controller, for controlling a transmission with clutch actuators that disengage a clutch of a multi-speed transmission, the transmission further including a shift actuator that performs gear shift of the multi-speed transmission; a clutch lever; a lever operation amount detector that converts an operation amount of the clutch lever to an electrical signal and outputs the electrical signal to the controller; and a shift switch that outputs a command of gear shifting by a driver to the controller, the method comprising:
performing a control in an AMT mode, an AT mode, or a MT mode,
performing a series of shift change operations when an operation mode is the AMT mode by controlling the clutch actuators and the shift actuator in a coordinated fashion when a shift change command is input by an operation of the shift switch by the driver in a transmission operation during traveling, and the clutch actuator is controlled regardless of an operation of the clutch lever by the driver in a starting process and a stopping process;
performing a shift selection and the series of shift change operations when an operation mode is the AT mode by controlling the clutch actuators and the shift actuator regardless of the operation of the shift switch by the driver in the transmission operation during traveling, and the clutch actuator is controlled regardless of the operation of the clutch lever by the driver in the starting process and the stopping process; and
performing the series of shift change operations when an operation mode is the MT mode by controlling the clutch actuators and the shift actuator in a coordinated fashion when the shift change command is input by the operation of the shift switch by the driver in the transmission operation during traveling, and the clutch actuators are controlled such that the clutch is operated with a clutch torque capacity corresponding to the operation of the clutch lever by the driver in at least one of the starting process and the stopping process; wherein a mode switching switch that outputs a request to change the operation mode by the driver to the controller unit is further provided; and
the controller performs a mode selection control such that, when performing a mode transition between the AT mode or the AMT mode and the MT mode, the driver at least has to operate the mode switching switch while operating the clutch lever with an operation amount not smaller than a predetermined threshold and an accelerator opening of an engine is not greater than a prescribed value.

11. The method for controlling a transmission according to claim 10, further comprising:
adding a condition that a start control of a vehicle is not being performed to a condition of the mode transition between the AT mode or the AMT mode and the MT mode.

12. The method for controlling a transmission according to claim 10, further comprising, when receiving the request to change the operation mode in the AMT mode, selecting:
(a) the MT mode when the accelerator opening is not greater than the prescribed value, and the operation amount of the lever is not smaller than the threshold, and, a start control is not being performed;
(b) the AT mode when the accelerator opening is not greater than the prescribed value, and the operation amount of the lever is smaller than the threshold or the start control is being performed; or
(c) the AMT mode when the accelerator opening is greater than the prescribed value; and/or
when receiving the request to change the operation mode in the AT mode, selecting:
(d) the MT mode when the accelerator opening is not greater than the prescribed value, and the operation amount of the lever is not smaller than the threshold, and, the start control is not being performed;
(e) the AMT mode when the accelerator opening is not greater than the prescribed value, and the operation amount of the lever is smaller than the threshold or the start control is being performed; or
(f) the AT mode when the accelerator opening is greater than the prescribed value; and/or
when receiving the request to change the operation mode in the MT mode, selecting:
(g) the AMT mode when the accelerator opening is not greater than the prescribed value, and the operation amount of the lever is not smaller than the threshold, and the start control is not being performed; or
(h) the MT mode when the accelerator opening is greater than the prescribed value, and the operation amount of the lever is smaller than the threshold, or the start control is being performed.

* * * * *